2,870,030
HIGH-INDEX GLASS ELEMENTS

Norman H. Stradley, St. Paul, and Warren R. Beck, Mahtomedi, Minn., assignors to Minnesota Mining & Manufacturing Company, St. Paul, Minn., a corporation of Delaware No Drawing. Application July 18, 1955
Serial No. 522,842

9 Claims. (Cl. 106—47)

This invention relates to our discovery of transparent high-index glass elements which are novel as to composition and which have extraordinarily high refractive index ($n_D$) values (at least 2.2). We have succeeded in making useful, transparent glass elements having refractive indices as high as, and higher than, that of diamonds (i. e., higher than 2.4). Our glasses have very high optical dispersion values. They are resistant to attack by acids. They have very high dielectric constants and low losses. They are stable to all weather conditions.

Our glasses lie outside the field of optical glasses as ordinarily conceived. The manufacture of lenses, prisms and other glass elements of optical instruments generally requires the making of glass blanks of substantial size and thickness. The necessary pieces of solid glass must be formed from molten glass without devitrification taking place during the cooling that is required to avoid excessive mechanical strains. The slower the cooling, the greater the tendency to devitrify. Hence glass formulations must be employed which will not result in devitrification in making the sizeable pieces of glass that are to be finished in manufacturing the final optical elements, such as lenses and prisms.

Our glass compositions are of such a nature that they cannot be employed in making optical elements of the usual sizes and shapes. They have a strong devitrification tendency. We have discovered, however, that they can be employed in making commercially useful glass elements provided these elements have a thickness not exceeding approximately two millimeters. These elements are sufficiently thin to permit rapid cooling or quenching of the hot glass so that they can be brought to room temperature without devitrifying.

Examples of glass elements with which we are concerned are glass beads, fibers, flakes and thin plates.

We have provided glass compositions that melt to a very free-flowing state. This is of great importance in the manufacture of glass beads by methods wherein the molten particles of glass form themselves into spheres due to the surface tension effect. The fluidity of our molten glasses permits the formation of true spheres during the available time interval. The beads should be homogeneous and have a nearly perfect sphericity in order to function properly as sphere-lenses. Such sphere-lenses can be used as optical elements in the type of reflex-reflectors described in U. S. Patent No. 2,407,680 (September 17, 1946). For this application the glass beads should preferably have a refractive index above 2.3 or 2.4.

We have provided glass elements which are not only transparent but which are substantially colorless. Some of the glass compositions have a yellowish tint but this is not objectionable for most uses. These glasses can be colored, if desired, by inclusion of small amounts of suitable color-imparting oxides, e. g., oxides of chromium, nickel, etc.

The glass beads used for optical lens elements have a preferred diameter in the range 0.5 to 10 mils, although beads of other sizes can be used. The beads can be made by fusing particles of glass cullet which are blown or dropped through a high temperature flame or a radiant heating zone to soften them sufficiently to form transparent spheres by the action of surface tension while moving through air, followed by rapid cooling to harden the spheres without devitrification. The cullet can be made by quenching a stream of molten glass in water.

The glass elements can also be made directly from a batch of molten glass. Fibers can be made by jet-blowing a stream of molten glass as is done in the rock wool and staple glass fiber manufacture. Plates and flakes of glass can be made by casting a thin layer of molten glass on a cold steel surface. These techniques are illustrative but not restrictive of means for forming thin glass elements from our glasses.

The transparent glass elements of this invention, which have refractive indices of at least 2.2, are fundamentally characterized as to the composition as set forth broadly in the following table:

Table A

| | |
|---|---|
| $Bi_2O_3$ | 70–99 |
| $TiO_2$ | 0–30 |
| $Bi_2O_3 + TiO_2$ | 80–100 |
| ZnO | 0–15 |
| Alkaline earth oxides | 0–20 |
| Strong glassformers | 0–10 |

All ranges specified in the table are in weight percent of the total glass composition. Alkaline earth oxides which may be present in our glass compositions up to a total of 20% by weight are barium oxide, magnesium oxide, calcium oxide, and strontium oxide. Common strong glassformers well known in this art are boron oxide, silicon dioxide, phosphorous pentoxide and germanium oxide. These glassformers do not exceed a total of 10%, and preferably do not exceed a total of 5%, by weight of our total glass composition. Although not necessary ingredients, strong glassforming oxides impart desired improvement in properties to these glasses when present in small amounts. From Table A it will be noted that if no titanium dioxide is present in our glass compositions, the total amount of $Bi_2O_3$ will be at least approximately 80% by weight of the total glass composition.

We have also made the surprising discovery that a large amount of bismuth oxide and a relatively small amount of titanium oxide can be formed into a transparent glass with unusually high acid resistance and high refractive indices (above 2.4). No other oxide need be present in the glass.

Our preferred glass elements, i. e., those with extraordinarily high acid-resistance, as well as high refractive index, good transparency, etc., are formed from glass compositions fundamentally characterized as to composition as set forth in the following table:

Table B

| | |
|---|---|
| $Bi_2O_3$ | 70–95 |
| $TiO_2$ | 5–30 |
| $Bi_2O_3 + TiO_2$ | 90–100 |
| ZnO | 0–10 |
| Alkaline earth oxides | 0–10 |
| Strong glassformers | 0–5 |

The total amount of bismuth trioxide and titanium dioxide in our preferred compositions is at least approximately 90% by weight of the total glass composition. Strong glassformers may approach a total of approximately 5% by weight of these compositions but preferably are kept below a total of approximately 3%. These glass elements have refractive indices above 2.4.

While our glass compositions are reported in terms of oxide components in accordance with general custom, it will be recognized that compounds other than oxides can be added in the original glass-making charge in amounts calculated to provide the desired amount of oxide. For example, bismuth nitrate, boric acid and others can be used. Ordinarily titanium dioxide itself will be added for the titanium dioxide component of the composition. Small amounts of fluorine can be included to promote fluidity.

For best results the glasses of this invention are melted in non-porous corrosion-resistant crucibles. Satisfactory results have been obtained with unglazed Coors porcelain crucibles and with impervious aluminum oxide crucibles. "Coors" is a name applied to highly refractory alumina-silicate porcelain crucibles. These glasses cannot be satisfactorily melted in ordinary porous clay or "kyanite" crucibles because they are extremely fluid and even watery at the temperatures employed (e. g., 1000° C.) and show a tendency to soak into the walls of such vessels.

The invention is illustrated by the examples set forth in the following table, showing exemplary glass compositions which have been used to make transparent glass beads, the refractive indices ($n_D$) being listed in the last column.

*Table I*

[Percentage composition by weight]

| Ex. No. | $TiO_2$ | $Bi_2O_3$ | ZnO | BaO | $B_2O_3$ | Other Ingredients | | $n_D$ |
|---|---|---|---|---|---|---|---|---|
| 1 | 11 | 84 | 4 | | | $SiO_2$ | 1 | 2.52 |
| 2 | 14 | 80 | | 5 | | $SiO_2$ | 1 | 2.48 |
| 3 | 15 | 84 | | | | $P_2O_5$ | 1 | 2.48 |
| 4 | 5 | 94 | | | | $SiO_2$ | 1 | 2.42 |
| 5 | 15 | 84 | | | 1 | | | 2.47 |
| 6 | 15 | 84 | | | | $GeO_2$ | 1 | 2.49 |
| 7 | 6.2 | 90.2 | 1.2 | 2.4 | | | | 2.55 |
| 8 | 7.7 | 89.4 | | 2.9 | | | | 2.54 |
| 9 | 10.1 | 88 | | 1.9 | | | | 2.52 |
| 10 | 14.2 | 81.8 | | 4 | | | | 2.51 |
| 11 | 6 | 92.1 | 1.9 | | | | | 2.49 |
| 12 | 12.8 | 87.2 | | | | | | 2.55 |
| 13 | 21 | 73 | | 6 | | | | 2.50 |
| 14 | 15 | 85 | | | | | | 2.59 |
| 15 | 19.3 | 80.7 | | | | | | 2.59 |
| 16 | 22.3 | 77.7 | | | | | | 2.58 |
| 17 | 26.4 | 73.6 | | | | | | 2.58 |
| 18 | | 97 | | | 3 | | | 2.45 |
| 19 | | 98 | | | 2 | | | 2.50 |
| 20 | | 93 | | | | $SiO_2$ | 7 | 2.36 |
| 21 | | 90 | | | | $P_2O_5$ | 10 | 2.33 |
| 22 | | 90.7 | | 7.4 | 1.9 | | | 2.37 |
| 23 | | 94.2 | | | 1.9 | MgO | 3.9 | 2.43 |
| 24 | | 92.5 | | | 1.9 | CaO | 5.6 | 2.30 |
| 25 | | 92.5 | | | 1.9 | SrO | 5.6 | 2.36 |
| 26 | | 97.1 | 2.9 | | | | | 2.56 |
| 27 | | 87.0 | 13.0 | | | | | 2.48 |
| 28 | | 80.0 | 5.0 | 12.0 | | CaO | 3.0 | 2.27 |
| 29 | | 90.7 | 7.4 | | 1.9 | | | 2.38 |

The glasses hereof containing titanium dioxide within the range specified in Table B above, and illustrated as Examples 1 through 17, possess extraordinary resistance to attack by acids. For example, the glass of composition No. 1 withstood immersion in one normal sulfuric acid for three hours without noticeable attack. Preferred glasses hereof also exhibit the best balance of high refractive index, vitreosity, and color, as well as chemical durability, for use in reflux-reflective applications. They are transparent and have only a very slight yellowish tint.

Having described various embodiments of our invention, for purposes of illustration rather than limitation, what we claim is as follows:

1. Transparent glass beads resistant to attack by acids and having a diameter not exceeding 10 mils, said beads being formed from a glass characterized by having a refractive index of at least 2.2 and essentially consisting of a metal oxide combination meeting the composition requirements of the following table wherein amounts are specified in weight percent:

| | |
|---|---|
| $Bi_2O_3$ | 70–99 |
| $TiO_2$ | 0–30 |
| $Bi_2O_3+TiO_2$ | 80–100 |
| ZnO | 0–15 |
| Alkaline earth oxides | 0–20 |
| Strong glassformers | 0–10 | said alkaline earth oxides being selected from the group consisting of BaO, MgO, CaO, and SrO, and said strong glassformers being selected from the group consisting of $B_2O_3$, $SiO_2$, $P_2O_5$, and $GeO_2$.

2. Glass beads according to claim 1 wherein the glass contains at least one strong glassforming oxide in an amount below 5% by weight of the total glass composition.

3. Transparent glass beads highly resistant to attack by acids and having a diameter not exceeding 10 mils, said beads being formed from a glass characterized by having a refractive index of at least 2.4 and essentially consisting of a metal oxide combination meeting the composition requirements of the following table wherein amounts are specified in weight percent:

| | |
|---|---|
| $Bi_2O_3$ | 70–95 |
| $TiO_2$ | 5–30 |
| $Bi_2O_3+TiO_2$ | 90–100 |
| ZnO | 0–10 |
| Alkaline earth oxides | 0–10 |
| Strong glassformers | 0–5 | said alkaline earth oxides being selected from the group consisting of BaO, MgO, CaO, and SrO, and said strong glassformers being selected from group consisting of $B_2O_3$, $SiO_2$, $P_2O_5$, and $GeO_2$.

4. Glass beads according to claim 3 wherein the glass contains at least one strong glassforming oxide in an amount below 3% by weight of the total glass composition.

5. Transparent glass elements resistant to attack by acids and having a thickness not exceeding approximately 2 mm., said elements being formed from a glass characterized by having a refractive index of at least 2.2 and essentially consisting of a metal oxide combination meeting the composition requirements of the following table wherein amounts are specified in weight percent:

| | |
|---|---|
| $Bi_2O_3$ | 70–99 |
| $TiO_2$ | 0–30 |
| $Bi_2O_3+TiO_2$ | 80–100 |
| ZnO | 0–15 |
| Alkaline earth oxides | 0–20 |
| Strong glassformers | 0–10 | said alkaline earth oxides being selected from the group consisting of BaO, MgO, CaO, and SrO, and said strong glassformers being selected from the group consisting of $B_2O_3$, $SiO_2$, $P_2O_5$, and $GeO_2$.

6. Glass elements according to claim 5 wherein the glass contains at least one strong glassforming oxide in an amount below 5% by weight of the total glass composition.

7. Transparent glass elements highly resistant to attack by acids and having a thickness not exceeding approximately 2 mm., said elements being formed from a glass characterized by having a refractive index of at least 2.4 and essentially consisting of a metal oxide combination meeting the composition requirements of the following table wherein amounts are specified in weight percent:

| | |
|---|---|
| $Bi_2O_3$ | 70–95 |
| $TiO_2$ | 5–30 |
| $Bi_2O_3+TiO_2$ | 90–100 |
| ZnO | 0–10 |
| Alkaline earth oxides | 0–10 |
| Strong glassformers | 0–5 | said alkaline earth oxides being selected from the group consisting of BaO, MgO, CaO, and SrO, and said strong glassformers being selected from the group consisting of $B_2O_3$, $SiO_2$, $P_2O_5$, and $GeO_2$.

8. Glass elements according to claim 7 wherein the glass contains at least one strong glassforming oxide in an amount below 3% by weight of the total glass composition.

9. Transparent glass beads highly resistant to attack by acids and having a diameter not exceeding 10 mils, said beads being formed from a glass characterized by having a refractive index of at least 2.5 and essentially consisting of 11% $TiO_2$, 84% $Bi_2O_3$, 4% ZnO, and 1% strong glassformers selected from the group consisting of $B_2O_3$, $SiO_2$, $P_2O_5$ and $GeO_2$.

References Cited in the file of this patent

UNITED STATES PATENTS

| | | |
|---|---|---|
| 2,220,765 | Hirose et al. | Nov. 5, 1940 |
| 2,726,161 | Beck et al. | Dec. 6, 1955 |

OTHER REFERENCES

Chem. Abstracts, 44, 7117e (1950).
Chem. Abstracts, 45, 4519g (1951).
Chem. Abstracts, 47, 4237f (1953).